US012772924B2

(12) United States Patent
Hodel

(10) Patent No.: US 12,772,924 B2
(45) Date of Patent: Oct. 27, 2026

(54) SEED RETAINING

(71) Applicant: Precision Planting LLC, Tremont, IL (US)

(72) Inventor: Jeremy J. Hodel, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 225 days.

(21) Appl. No.: 18/723,768

(22) PCT Filed: Jan. 26, 2023

(86) PCT No.: PCT/IB2023/050677
§ 371 (c)(1),
(2) Date: Jun. 24, 2024

(87) PCT Pub. No.: WO2023/161736
PCT Pub. Date: Aug. 31, 2023

(65) Prior Publication Data

US 2025/0063980 A1 Feb. 27, 2025

Related U.S. Application Data

(60) Provisional application No. 63/268,319, filed on Feb. 22, 2022.

(51) Int. Cl.
*A01C 7/20* (2006.01)
*A01C 5/06* (2006.01)
(Continued)

(52) U.S. Cl.
CPC .............. *A01C 7/206* (2013.01); *A01C 5/066* (2013.01); *A01C 7/082* (2013.01); *A01C 23/025* (2013.01)

(58) Field of Classification Search
CPC ......... A01C 7/206; A01C 5/066; A01C 7/082; A01C 23/025
See application file for complete search history.

(56) References Cited

U.S. PATENT DOCUMENTS 8,336,470 B2 * 12/2012 Rans ...................... A01C 7/046 111/170
11,632,959 B2 * 4/2023 Martin .................. A01N 25/00 504/116.1
(Continued)

FOREIGN PATENT DOCUMENTS

CN 111886977 A 11/2020
CN 111543151 B 7/2021
(Continued)

OTHER PUBLICATIONS

UK Intellectual Property Office, Search Report for related UK Application No. GB2204223.8, dated Sep. 7, 2022, 4 pages.
(Continued)

*Primary Examiner* — Kambiz Abdi

(57) ABSTRACT

A method of depositing oriented seeds into a trench including forming a trench (299); depositing a foam (289) into the trench (299); and depositing seed (279) from a seed orientation device (270) into the foam (289) in the trench (299). Also, an agricultural row unit (200) having: a frame (204); an opening unit (260) connected to the frame (204) for opening a trench (299) as the row unit (200) moves in a direction of travel: a foam delivery tube (281) for delivering foam (289) into the trench (299) opened by the opening unit (260); and a seed orientation device (270) disposed rearward from the foam delivery tube (281) for delivering oriented seeds (279) in the foam (289) delivered by the foam delivery tube (281).

30 Claims, 7 Drawing Sheets

(51) Int. Cl.

| | |
|---|---|
| ***A01C 7/08*** | (2006.01) |
| ***A01C 23/02*** | (2006.01) |

(56) References Cited

U.S. PATENT DOCUMENTS

| | | | | |
|---|---|---|---|---|
| 11,991,945 | B2 * | 5/2024 | Rice | A01B 79/005 |
| 12,477,971 | B2 * | 11/2025 | Rice | A01C 21/005 |
| 2010/0282145 | A1 * | 11/2010 | Preheim | A01C 7/0445 111/185 |
| 2015/0093426 | A1 * | 4/2015 | Martin | A01N 25/16 |
| 2015/0366187 | A1 | 12/2015 | Bird et al. | |
| 2017/0181433 | A1 * | 6/2017 | Martin | A01N 63/22 |
| 2018/0032776 | A1 | 2/2018 | Ekins et al. | |
| 2019/0223372 | A1 | 7/2019 | Koch et al. | |
| 2019/0230846 | A1 | 8/2019 | Koch et al. | |
| 2019/0289778 | A1 | 9/2019 | Koch et al. | |
| 2019/0289779 | A1 | 9/2019 | Koch et al. | |
| 2020/0367425 | A1 | 11/2020 | Dille et al. | |
| 2022/0192079 | A1 * | 6/2022 | Dille | A01C 7/084 |

FOREIGN PATENT DOCUMENTS

| | | | |
|---|---|---|---|
| GB | 2196824 | A | 5/1988 |
| GB | 2516061 | A | 1/2015 |
| JP | S4841603 | B1 | 12/1973 |
| SU | 738534 | A1 | 6/1980 |
| WO | 2023062463 | A1 | 4/2023 |
| WO | 2023062476 | A1 | 4/2023 |
| WO | 2023062498 | A1 | 4/2023 |
| WO | 2023062499 | A1 | 4/2023 |
| WO | 2023062500 | A1 | 4/2023 |
| WO | 2023062507 | A2 | 4/2023 |
| WO | 2023089408 | A1 | 5/2023 |
| WO | 2023105319 | A1 | 6/2023 |

OTHER PUBLICATIONS

European Patent Office, Search Report for related PCT Application No. PCT/IB2023/050677, dated May 2, 2023, 16 pages.

* cited by examiner

FIGURE 5
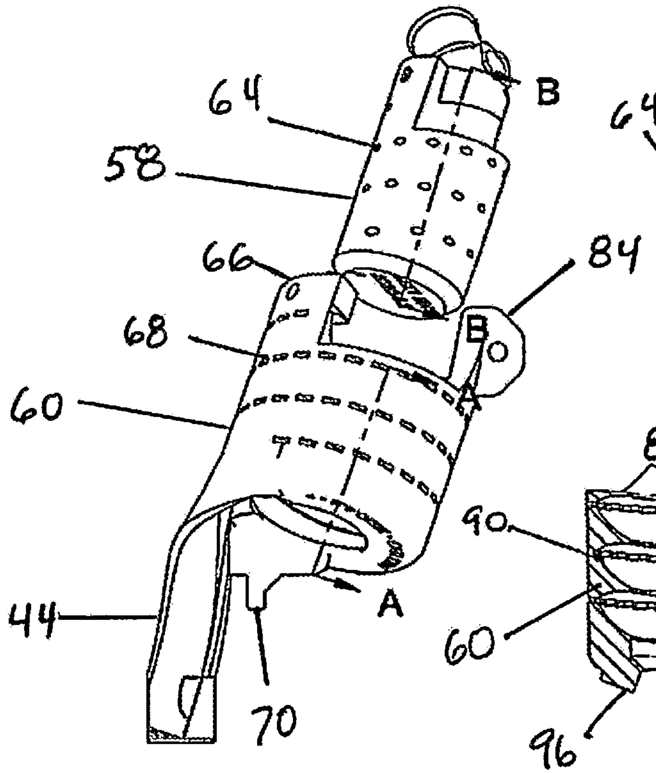
FIGURE 6A
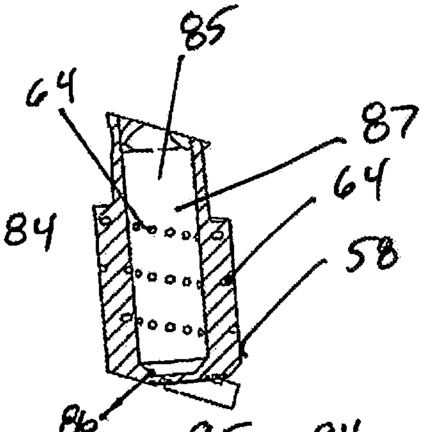
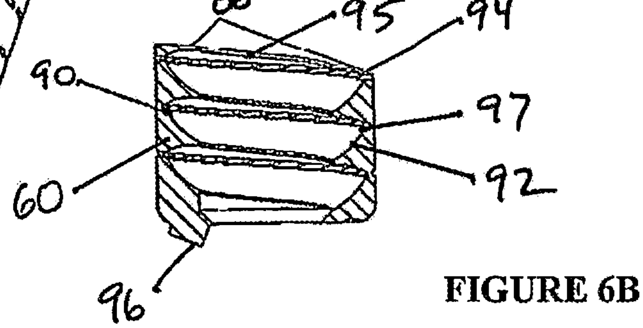
FIGURE 6B
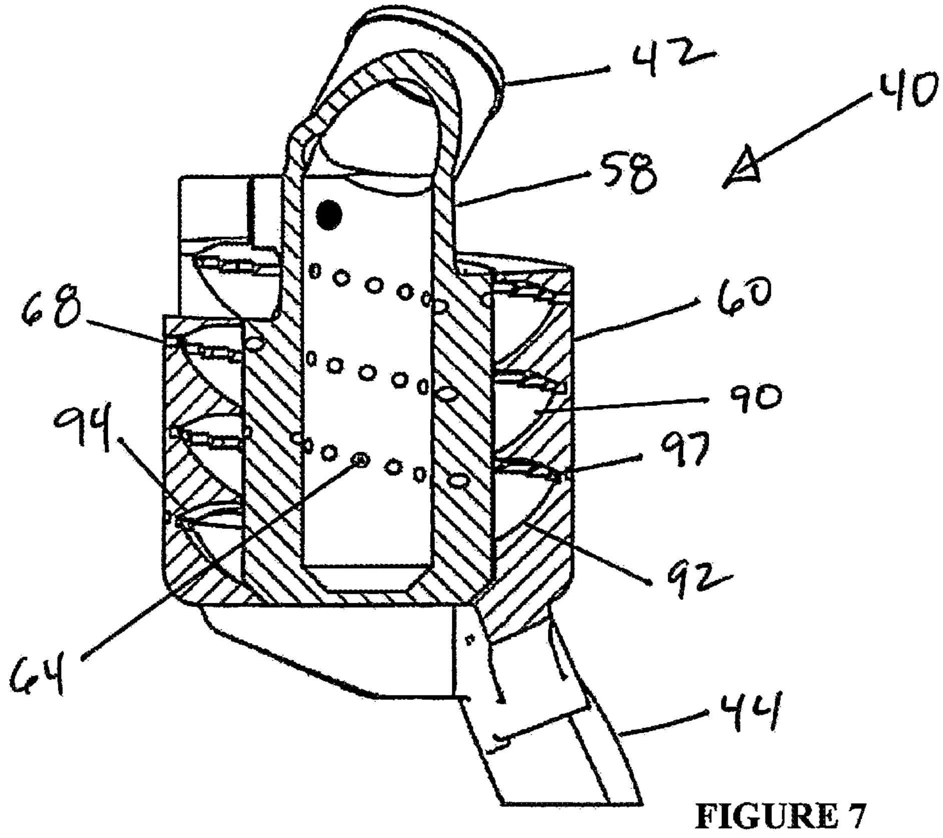
FIGURE 7

SEED RETAINING

CROSS-REFERENCE TO RELATED APPLICATIONS

This application is a national phase entry under 35 U.S.C. § 371 of International Patent Application PCT/IB2023/050677 filed Jan. 26, 2023, designating the United States of America and published in English as International Patent Publication WO 2023/161736 A1 on Aug. 31, 2023, which claims priority to U.S. Application No. 63/268,319, filed 22 Feb. 2022, which is incorporated herein by reference in its entirety.

BACKGROUND

There are several methods of orienting seeds for planting. Oriented seeds are deposited into furrows. It would be beneficial to ensure that seeds maintain their orientation after placement in the furrow.

BRIEF DESCRIPTION OF THE DRAWINGS

FIG. 5 is an exploded perspective view of the seed orientation coil assembly of a first embodiment of the seed orientation system FIG. 6A is a cross sectional view of an injector core taking along lines B-B of FIG. 5.

FIG. 6B is a cross sectional view of a vented outer coil taking along lines A-A of FIG. 5.

FIG. 7 is a cross sectional view of seed orientation coil assembly of a first embodiment of the seed orientation system.

DETAILED DESCRIPTION

Figure 1:
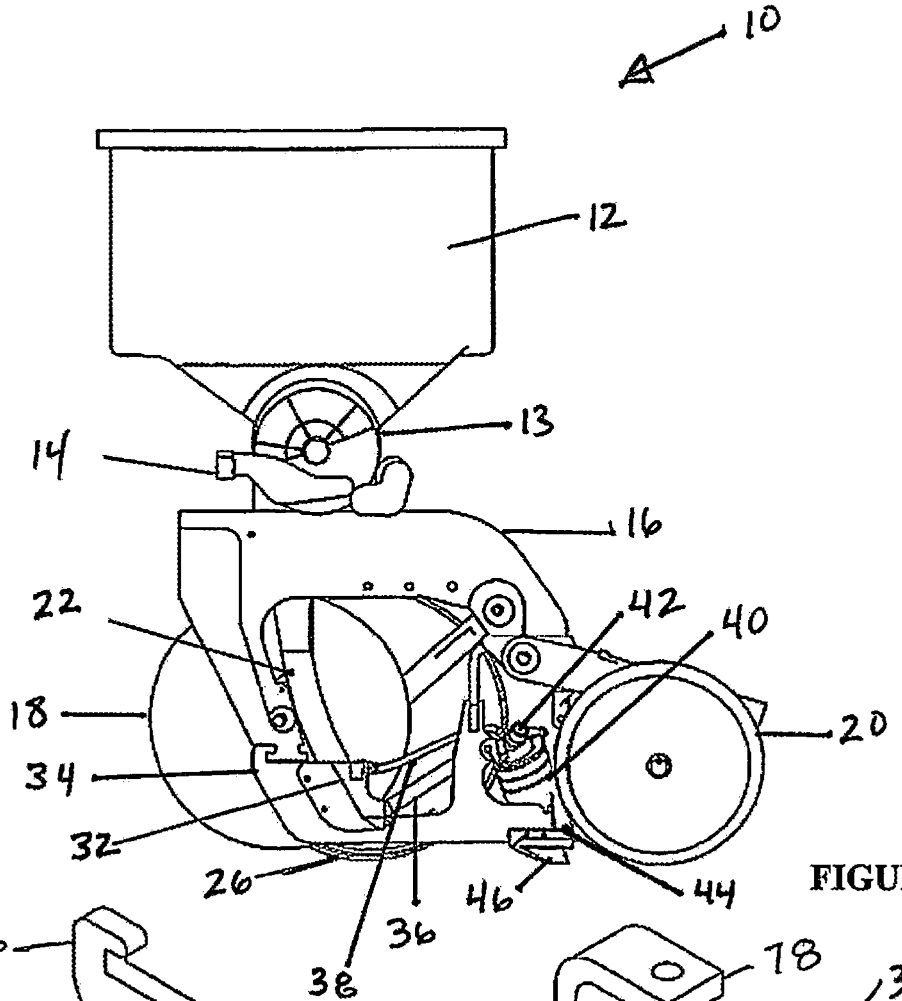
FIG. 1 illustrates a plan view of a first embodiment of the seed orientation system integrated into a planter row unit.

All references cited herein are incorporated herein in their entireties. If there is a conflict between a definition herein and in an incorporated reference, the definition herein shall control.

Examples of orientation systems include U.S. Provisional Application Nos. 63/254,488, filed 11 Oct. 2021; 63/262, 360, filed 11 Oct. 2021; 63/262,361, filed 11 Oct. 2021; 63/262,362, filed 11 Oct. 2021; 63/262,415, filed 12 Oct. 2021; 63/262,417, filed 12 Oct. 2021; 63/264,109, filed 16 Nov. 2021; and 63/265,107, filed 8 Dec. 2021, U.S. application Ser. No. 17/387,778, filed 28 Jul. 2021, and PCT Publication Nos. WO2018013858A1, WO2018013859A1, WO2018013860A2, and WO2018013861A1. One particular seed orienter is described in U.S. Patent Publication No. US2020/0367425A1.

Referring to the drawings, wherein like reference numerals designate identical or corresponding parts throughout the several views.

FIG. 1 illustrates a row unit 10 with the seed orientation system 30 of the present invention installed. Row unit 10 is an example of a commonly found planter unit designed for the purpose of delivering a seed into a furrow. Row unit 10 would typically be found mounted to a tool bar that attaches to a tractor or similar towing device along with other identical or similar planting row units. Row units can be found in even number groups from a few units to as many as forty-eight row units.

The typical row unit 10 includes seed hopper 12 for storing the seed for planting. The seed is directed to a seed meter 13. The seed meter 13 may use a conventional vacuum disk driven by a vacuum delivery line 14. The seed meter 13 acts to singulate the seed at a desired spacing for delivery to the ground. From the seed meter 13, the seed is delivered to the ground through seed tube 22.

A shank structure 16 provides the structural support for the seed hopper 12, seed meter 13 and the seed tube 22. Opener blade 18, a gauge wheels 26 and a closing wheels 20 are also attached to the shank 16. The opener blades 18 forms a trench or furrow in the soil ahead of the seed tube 22. The gauge wheel 26 control the depth of the furrow and the closing wheels 20 close the furrow over the seed.

In a first embodiment, seed orientation system 30 is mounted to the row unit 10. Seed orientations system 30 includes a seed collector 32 operably attached to the seed tube 22. The seed collector 32 gathers the seed and changes its direction by way of a seed transfer tube 36 to a seed orientation coil assembly 40. The seed passes through the helical path of the seed orientation coil assembly 40 to an oriented seed exit path 44. A sub-furrow opener 46 creates a wedge shaped trough within the furrow for capturing the oriented seed.

Movement of the seed throughout the seed orientation system 30 is aided by air from a central blower/fan. Air is first directed to system air infeed 42 disposed on the upper face of the seed orientation coil assembly 40. An air line 38 is then directed to seed collector 32 for moving the seed from the seed collector 32 to the seed orientation coil assembly 40.

Figure 2:
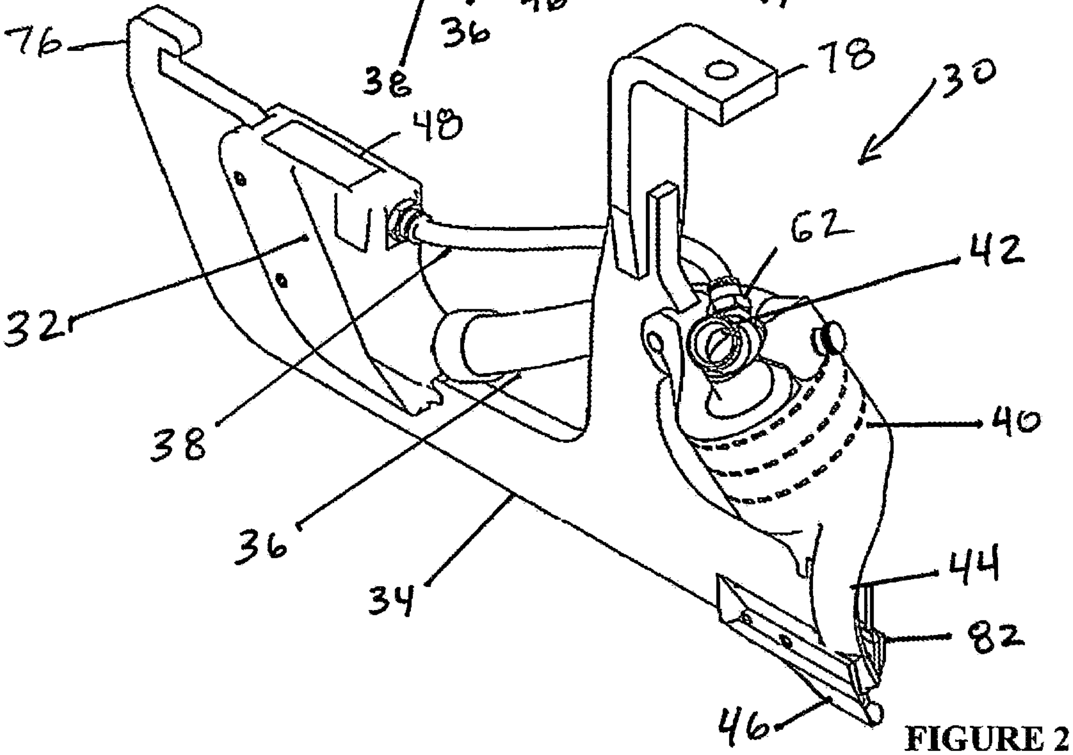
FIG. 2 is a perspective view of first embodiment of the seed orientation system.
Figure 3:
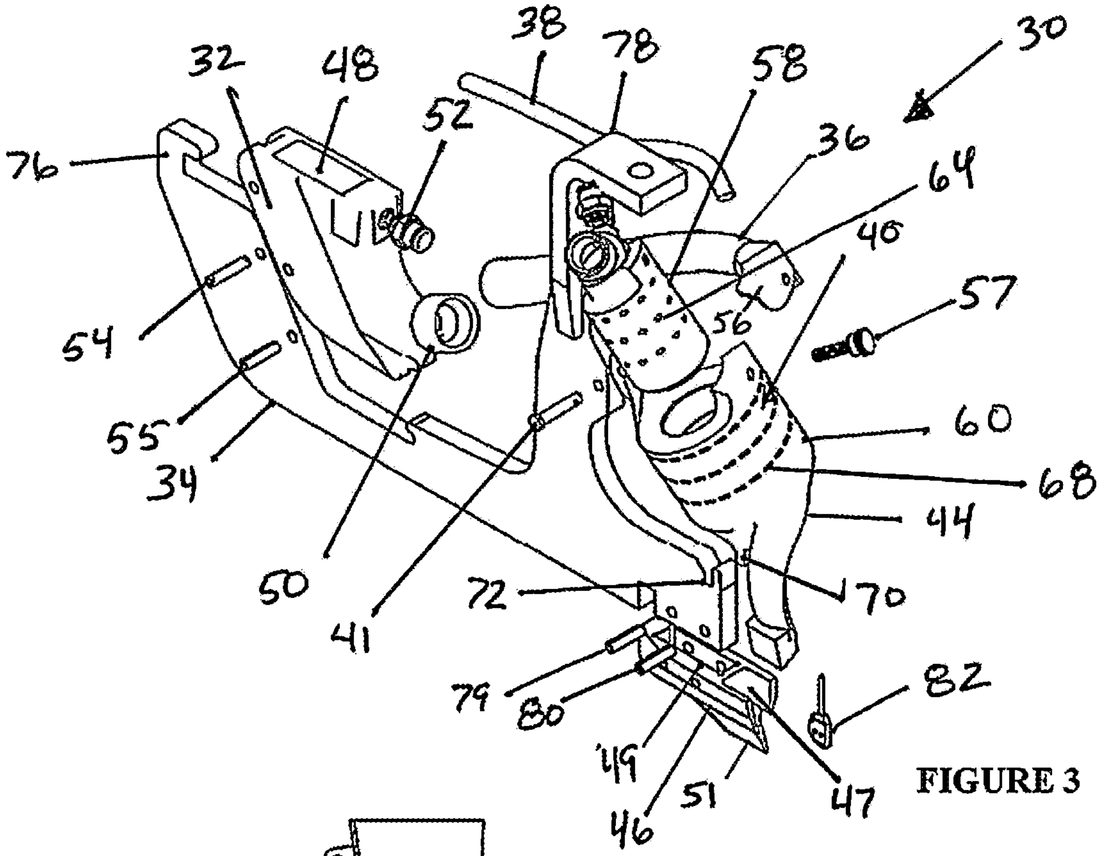
FIG. 3 is an exploded perspective view of a first embodiment of the seed orientation system.

A seed orientation support structure 34 provides the structural support for the seed collector 32, seed transfer tube 36, the seed orientation coil assembly 30 and the sub-furrow opener 46. The seed orientation support structure 34 may be connected to the shank structure 16 at one or more locations. The seed orientation support structure 34 also acts to keep debris out of the furrow and to protect against rock impacts FIGS. 2 and 3 depict the seed orientation system 30. Seed orientation system 30 includes a seed collector 32 that directs seeds from seed tube 22 to seed orientation coil assembly 40 by way of seed transfer tube 36. Seed collector 32 includes a seed entrance aperture 48 and a seed exit aperture 50. Seed entrance aperture 48 is sized to mate with the seed tube 22. An air line connection 52 is disposed adjacent to the seed entrance aperture. The seed collector 32 may include various indentations or flanges for connection to the seed orientation support structure 34, as well as pins 54 and 55.

Seed transfer tube 36 attaches to seed exit aperture 50 at a first end and to seed orientation coil 40 at a second end. It is envisioned that seed transfer tube 36 will include a mating flange 56 and a retaining pin 57 for connection to the seed orientation coil 40. Pin 41 retains the seed orientation coil assembly 40 relative to the support structure 34.

Seed orientation coil 40 includes an injector core 58 that resides within vented outer coil 60. The injector core 58 includes at a first end incoming air feed 42 and outgoing air feed 62 that provides air through air line 38 to air line connection 52 on the seed collector 32. Injector core 58 further includes a plurality of nozzles 64 arrayed in a helical pattern about the outer face of the injector core 58.

Vented outer coil 60 defines an aperture injector core 58. The vented outer coil 60 includes a seed entrance 66 that mates with flange 56 of the seed transfer tube 36. A plurality of vents 68 are disposed about the outer face of the vented outer coil 60. The vents 68 may have a variety of shapes including rectangular, circular, ellipsoid or other random shapes. The vents 68 do not have to be uniform in size or shape. At a second end of the vented outer coil 60, seed exit path 44 extends towards the ground. A seed sensor 82 may be attached to the vented outer coil 60 approximate the exit path 44 so as to monitor seed flow.

Seed orientation support structure 34 connects to the row unit shank 16 through hook 76 and flange mount 78. It is envisioned that the geometry and location of such connection points can be altered depending on the structure of the row unit 10. The seed orientation support structure 34 supports the seed orientation coil 40 through flange 70 which extends from the second end of vented outer coil 60. The flange 70 mates within notch 72 of the seed orientation support structure 34. The sub-furrow opener 46 is connected to the seed orientations support structure 34 by roll pins 79 and 80.

Figure 4:
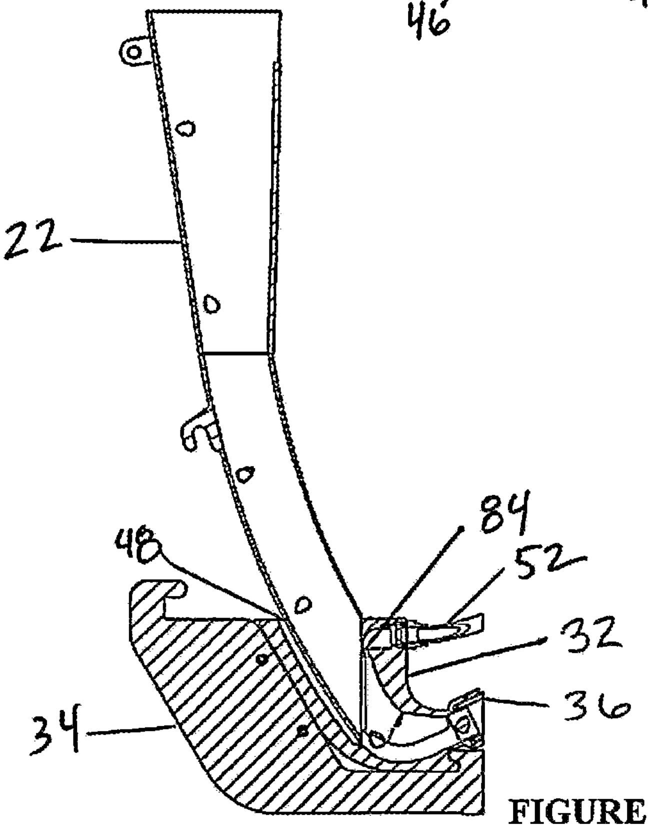
FIG. 4 is a cross sectional view of the seed collector on first embodiment of the seed orientation system.

FIG. 4 depicts the intersection between the seed tube 22 and seed transfer tube 36. The seed tube 22 is inserted through seed entrance aperture 48. Air feed 52 is operably connected to an air blade nozzle 84 which directs air towards the seeds. Air blade nozzle 84 propels the seeds into the seed transfer tube 36. Seeds exiting the seed tube 22 are in a random orientation with a high rotational energy as they have fallen from the seed meter 13 without any attempt at orientation.

FIGS. 5 through 7 depict a first embodiment of the seed orientation coil assembly 40 in which the random position of the seed is changed to an oriented tip down position. FIG. 6A illustrates an exploded view of the seed orientation coil assembly 40. FIG. 6A is a cross sectional view of the injector core 58 taken at B-B. FIG. 6B is a cross sectional view of the vented outer coil 60 taken at A-A. Injector core 58 is nested within vented outer coil 60. The vented outer coil 60 is attached to the seed orientation support structure 34 at flange 70 and mounting point 84.

The injector core 58 is generally cylindrical in shape with an air aperture 85 at a first end and a closed aft end 86. A plurality of nozzles 64 are shown in a helical pattern creating air passages between the central aperture 87 of the injector core and the vented outer coil 60.

The vented outer coil 40 is generally cylindrical in shape with an open central aperture for insertion of the injector core 58. The exterior wall of the vented outer coil 40 includes a plurality of vents 68 that create air passages. The vented outer coil 40 further includes seed entrance 66 that opens to helical pathway 90.

FIG. 6B illustrates the helical pathway 90 of the vented outer coil 60. Helical pathway 90 includes seed riding surface 92 that intersects with seed guide wall 94. The seed riding surface 92 is curved so as to have a tighter or smaller radius towards the aft end 96 and a wider radius at the seed entrance end 95. The seed guide wall 94 intersects the seed riding surface 92 at ninety degrees to form a seed riding path 97. The plurality of vents 68 are generally disposed at the level of the seed riding path 97 on the seed riding surface 92. In a first embodiment the helical pathway 90 completes three revolutions about the injector core 58.

FIG. 7 illustrates the cross-sectional view when the injector core 58 is disposed within the vented outer coil 60. In a first embodiment, the outer wall of the injector coil 58 forms the inner barrier for the helical pathway 90. As such, the vented outer coil 60 does not require an inner wall or barrier. The helical pathway 90 terminates at the seed exit path 44. The curvature of the helical pathway 90 is changed as it transitions to the seed exit path 44 so the flat of the corn seed stays firmly positioned against the exit wall. The direction change of the path also separates the somewhat chaotic airflow of the injector nozzles and leaves only a nice laminar flow that helps the seed retain its ordered state of sliding flat on the smooth path surface, tip forward.

Figure 8:
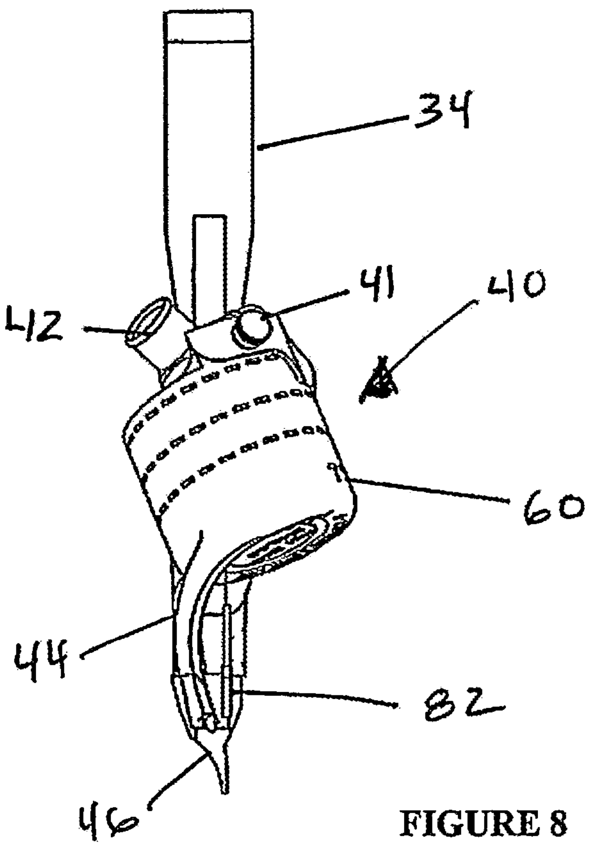
FIG. 8 is a rear perspective view of the seed orientation system
Figure 9:
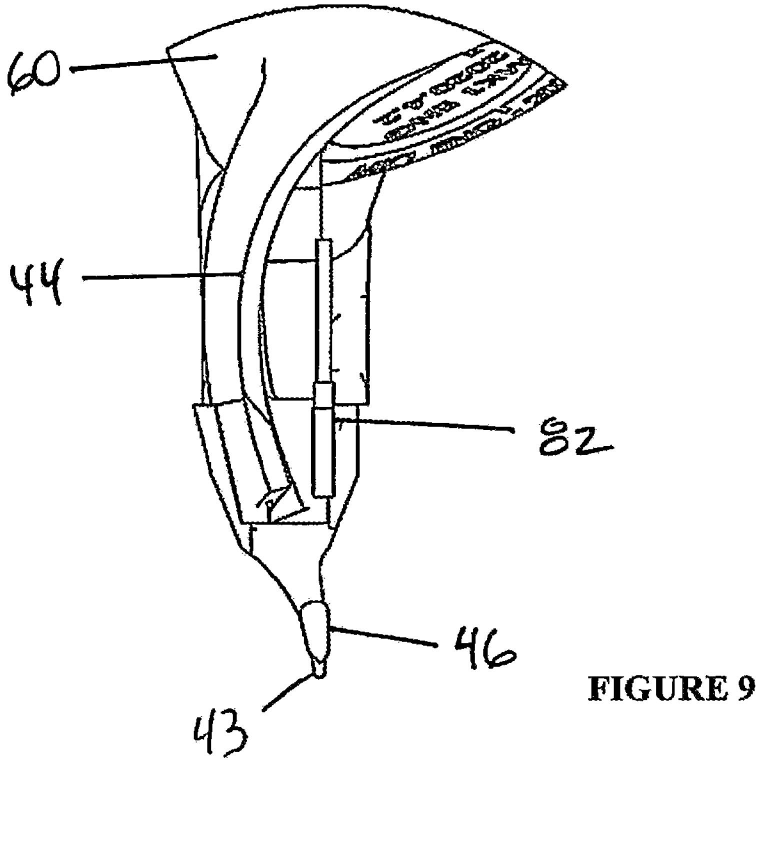
FIG. 9 is a detail view of the seed orientation system from FIG. 8.

FIGS. 8 and 9 illustrate the seed orientation exit path 44 and sub-furrow opener 46 which are part of the seed orientation coil assembly 40. The seed orientation exit path 44 is a continuation of the helical pathway 90. The seed sensor 82 is disposed approximate the seed exit point 45. The purpose of the seed sensor 82 is to make sure the row unit 10 is actually planting seeds and, if not, will alert the person in the tractor that the row isn't planting because either the seed ran out in hopper or seed is plugged in the seed tube.

As depicted in FIG. 3, the sub furrow opener 46 may define an exit path aperture 47 that holds the exit path 44 and a support structure aperture 49 that allows for mounting the sub-furrow aperture 46 to the seed orientation support structure 34. The sub-furrow opener 46 also features an extended bottom slot or extension 43 that shapes the sub-furrow to prevent the seed tip from hitting the bottom of the sub-furrow and recoiling out, losing its orientation. The seed sensor 82 is operably connected to the structure of the sub-furrow opener 46. The exit path is also swept backward to help reduce the horizontal velocity delta of the seed versus the ground that the seed is coming into contact with.

As the seed leaves the exit path 44 it will be airborne for a short distance, maintaining its stable state. The exit path 44 aims the seed at a sub-furrow created by a sub-furrow opener 46. The sub-furrow opener 46 shapes walls into the soil that come into contact with the flat sides of the seed, wedging the seed into the soil, retaining its orientation.

The sub-furrow opener 46 also has a blade 51 that is swept back. This is to prevent clogs from soil entering up into the seed path when the planter is initially setting down into the soil. This can be achieved because the seed is shot backward at an angle, missing contact with the former blade 51. This swept back former blade 51 also helps keep the sub-furrow walls from collapsing prematurely in loose soils. Collapsed walls would result in the seed bouncing, losing its orientation.

Figure 10:
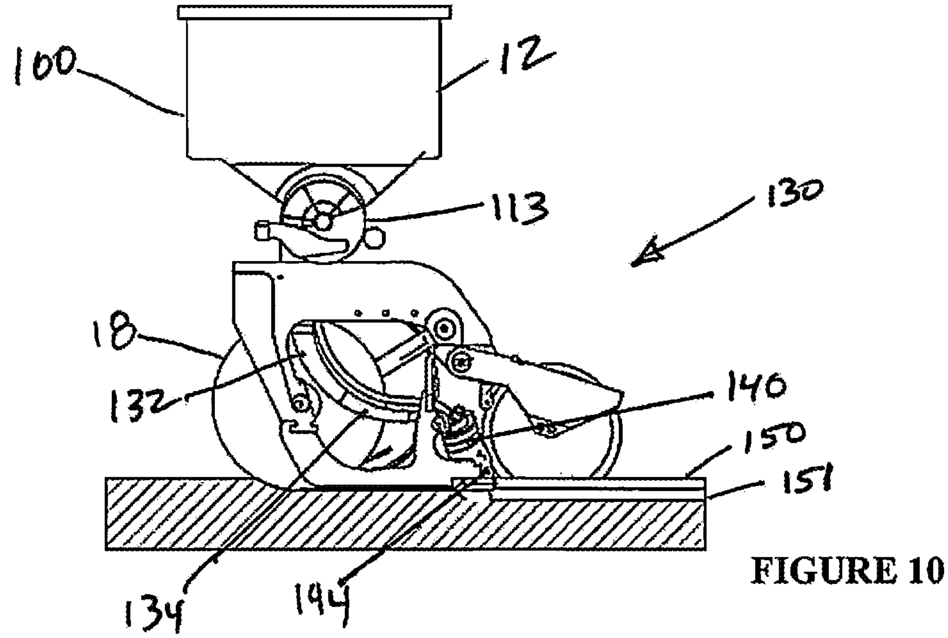
FIG. 10 is a planar view of a planter row unit with an alternate embodiment of a seed collector.
Figure 11:
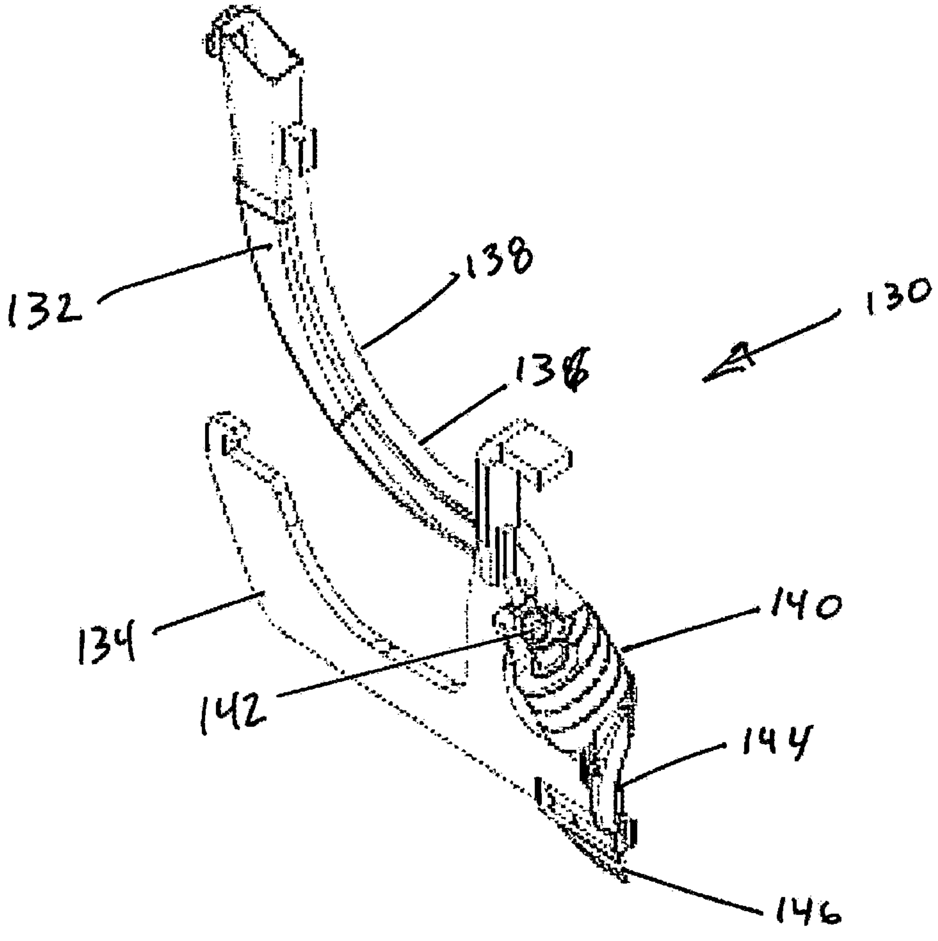
FIG. 11 is a planar view of an alternate embodiment of a seed collector.

FIGS. 10 and 11 illustrate an alternate seed collector design wherein the existing seed tube is removed and the seed orientation system 130 is directly connected to the seed meter. The seed orientation system 130 is mounted to the row unit 100. Seed orientations system 130 includes a seed collector 132 operably attached to the seed meter 113. The seed collector 132 gathers the seed and changes its direction by way of a seed transfer tube 136 to a seed orientation coil assembly 140. The seed passes through the helical path of the seed orientation coil assembly 140 to an oriented seed exit path 144. A sub-furrow opener 146 creates a wedge-shaped trough within the furrow for capturing the oriented seed. The opener blade 18 creates a furrow 150 and the sub-furrow opener creates a trough 151 within the furrow 150.

Movement of the seed throughout the seed orientation system 130 is aided by air from a central blower/fan. Air is first directed to system air infeed 142 disposed on the upper face of the seed orientation coil assembly 140. An air line 138 is then directed to seed collector 132 for moving the seed from the seed collector 132 to the seed orientation coil assembly 140. The seed collector 132 catches seeds directly from the seed meter 113 and gently transports the seed under air power in the most direct and efficient path possible to the seed orientation coil. This configuration improves seed spacing and minimizes seed tumbling. A seed orientation support structure 134 provides the structural support for the seed orientation coil 130 and the sub-furrow opener 142.

In operation, the seed orientation system 30 delivers seeds from a row unit 10 to the ground in an optimal growing orientation. Seeds are placed in seed hopper 12. The seed hopper 12 includes an opening to direct the seed to a seed meter 13. The seed meter 13 then attempts to singulate the seed and spaces the seed out for delivery into the ground. The seed orientation system 30 either collects the seed from the seed tube 22 or from a seed collector 132 that replaces the seed tube 22.

A high-flow pressurized air system propels the seed to from the seed collector 32, 132 through a seed transfer tube 36, 136 to the seed orientation coil assembly 40. A major factor in seed stability is catching/collecting the seed as gentle as possible from the seed meter. The seed ideally slides gently vs. tumbling into the orientation coil. This may be achieved by a very gentle and gradual collector path 132 from the meter to the coil to reduce acute angle impacts resulting in tumbling. A tumbling seed entering the orientation coil can result in tumbling through the entire coil as the air jets will just add to the disordered energy of the tumbling seed instead of stabilizing it.

The seed enters into a vented outer coil 60 of the seed orientation coil assembly 40, said vented outer coil 60 defining a helical pathway 90 to a seed exit path 44. The vented outer coil 60 includes a plurality of air vents 68 disposed radially about an outer wall of the vented outer coil 60.

Pressurized air is injected into the injector core 58 of the seed orientation coil assembly 40. The injector core includes a plurality of air injectors or nozzles 64 disposed radially about the outer wall of the injector core 58. The nozzles 64 direct a focused air stream across the helical pathway 90 of the vented outer coil 60. It is envisioned that the nozzles may be aligned with air vents 68.

Figure 12:
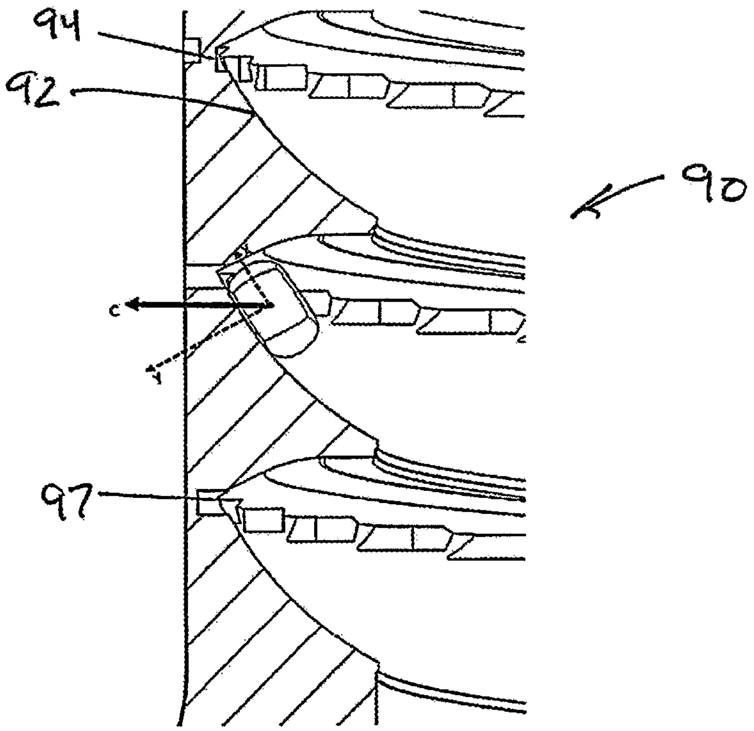
FIG. 12 is a cross sectional view of the vented outer coil illustrating the position of a seed and the representative centrifugal forces on the seed.
Figure 13:
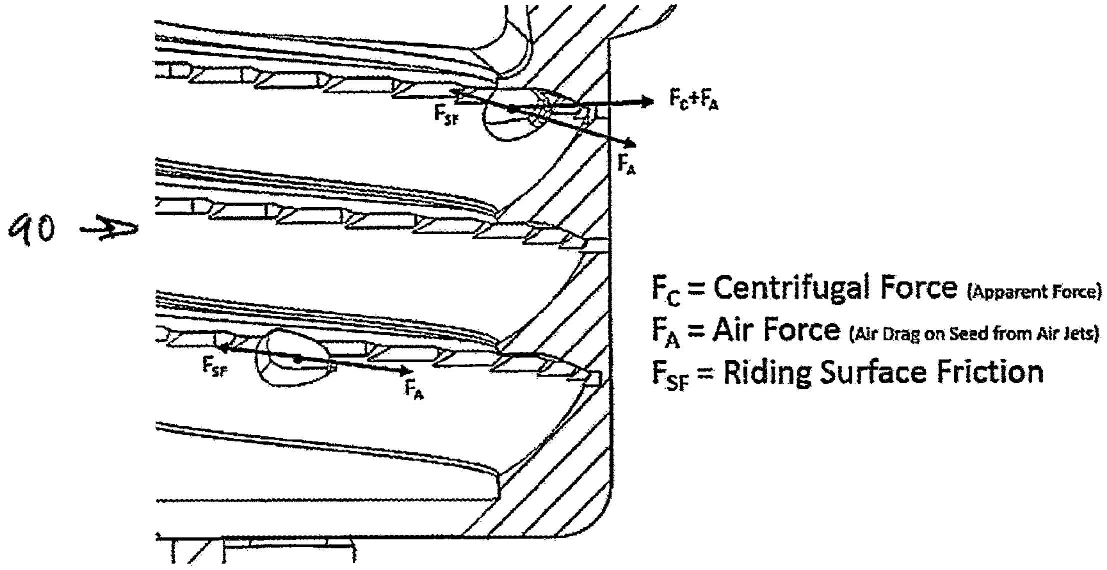
FIG. 13 is a cross sectional view of the vented outer coil illustrating the position of seeds and the representative aerodynamic forces.

The seed enters the helical pathway 90 is a random position. The airflow through the injector core and the vented outer coil 60 push the seed up the seed riding surface 92 to the seed guide wall 94. As illustrated in FIGS. 12 and 13, a centrifugal force Fc (an apparent force) is induced on the seed as it travels its curved/helical pathway 90. The airflow from the injector nozzles 64 hit the seed at an angle, giving two main (pressure) force vector components on the seed. One component pushes parallel to the seed path and the other pushes perpendicular to the seed path. The parallel component of the airflow flows from behind the seed and over the seed, this both propels the seed forward and causes the seed to orient tip forward in the flow (as this orientation has the lowest stable aerodynamic cross section (lowest drag)). This parallel airflow component also increases the velocity of the seed which makes soil capture possible. The parallel airflow may be a combination of the airflow generated by the seed meter and the air flow directed to the seed transfer tube. The perpendicular component of the airflow, combined with centrifugal force Fc, pushes the seed into the seed riding surface 92 and seed guide wall 94 to provide the stability needed to maintain the tip-forward orientation.

After the seed is oriented it is necessary to stabilize the position of the seed all the way to the ground. It is easy to orient a seed for a few seconds but due to the shape of the seed there is a tendency for the seed to tumble out of control. Keeping the seed stable after orientation requires a combination of techniques. In order to a maintain position of the seed, a low friction surface for the helical path 90 is preferred. Low friction, low roughness and/or lubricious surface reduces any tumbling of the seed as the seed will not "dig in" or "catch" on the surface and instead induce the seed to slide, maintaining an oriented position. An energy absorbing surface is also beneficial for it will "deaden" seed impact energy from tumbling and allow the seed to ride vs. rolling and/or tumbling and help maintain an oriented position. The path from the seed meter 13 to the orientation coil 40 also benefits from the properties listed above for the orientation coil riding surface 90.

A curved path also acts to maintain the seed orientation through a centrifugal force Fc. The centrifugal force Fc acts on the seed, to drive the seed into the surface to stabilize and reduce bouncing, tumbling and to help retain an oriented position. In addition to the curved pathway 90, a riding surface shape/profile that has a guide wall helps to precisely locate, stabilize, and maintain the orientation of an oriented seed. The curved shape of the riding surface will also help align the seed longitudinally along the seed path which aids in the orientation process.

The seed is then directed to the seed exit path 44 and then into a scored sub-furrow inside a main furrow that is used to capture or wedge the seed to retain its orientation and/or position. The seed orientation can be captured/preserved if the seed is propelled into an interference fit sub-furrow in the soil that the seed wedges into. The sub-furrow profile preferably needs to taper down to allow seeds of all sizes to be captured. The profile should also have an extended bottom to prevent the seed tip from hitting the bottom of the sub-furrow and recoiling out before becoming wedge/taper locked.

The seed orientation coil assembly 40 is angled relative to the normal with the ground to help reduce the seed/ground velocity delta. At a typical 5 mph planting speed and what would be a 5 mph horizontal velocity delta, the angled coil should reduce the velocity delta to about 2 mph. At a slower 3 mph planting speed, the seed would be a dead drop into the sub-furrow.

Figure 14:
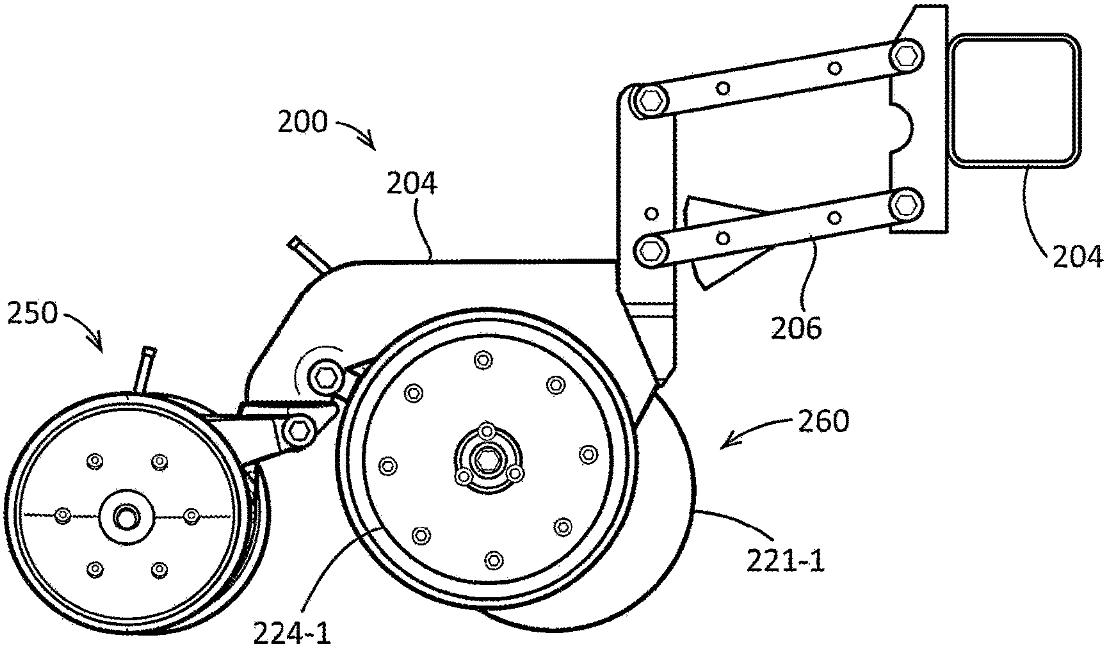
FIG. 14 is a side elevation view of a row unit.
Figure 15:
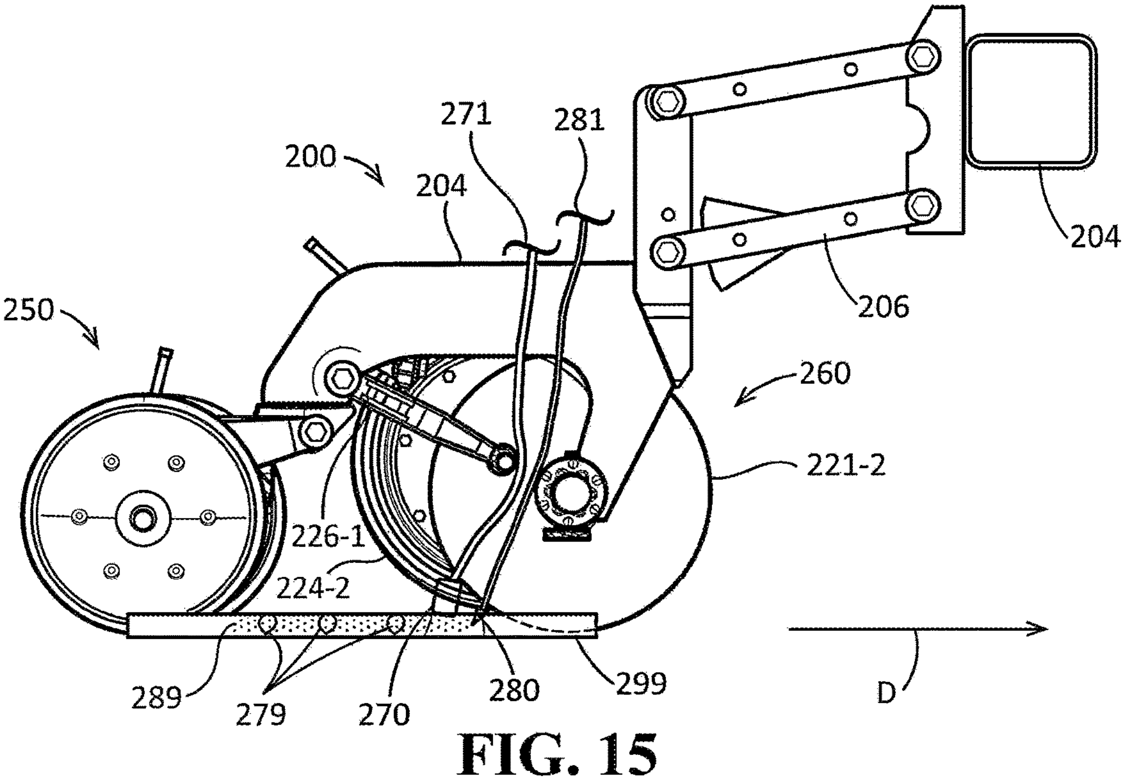
FIG. 15 is a side elevation view of the row unit of FIG. 14 with a gauge wheel and opening disc removed.

FIGS. 14 and 15 illustrate a row unit 200 for depositing seeds 279 from a seed orientation device 270 into trench 299. Row unit 200 is connected to a toolbar 204 via four bar linkage 206. Row unit 200 has a frame 204 with an opening system 260 having opening discs 221 (221-1, 221-2) attached to row unit frame 204 for opening trench 209 as row unit 200 travels in a direction of travel D and gauge wheels 224 (224-1, 224-2) connected via gauge wheel arms 226 (226-1, 226-2) for setting a depth of trench 299.

Seed orientation device 270 can be seed orientation coil 40 described above or any orientation device described in U.S. Provisional Application Nos. 63/254,488, filed 11 Oct. 2021; 63/262,360, filed 11 Oct. 2021; 63/262,361, filed 11 Oct. 2021; 63/262,362, filed 11 Oct. 2021; 63/262,415, filed 12 Oct. 2021; 63/262,417, filed 12 Oct. 2021; 63/264,109, filed 16 Nov. 2021; and 63/265,107, filed 8 Dec. 2021, U.S. application Ser. No. 17/387,778, filed 28 Jul. 2021, and PCT Publication Nos. WO2018013858A1, WO2018013859A1, WO2018013860A2, and WO2018013861A1. One particular seed orienter is described in U.S. Patent Publication No. US2020/0367425A1.

Seed 279 can be supplied to seed orientation device 270 via conduit 271, which can be seed transfer tube 36 described above.

While seed orientation device 270 can orient and deliver seeds 279 to trench 299, there may be conditions that disturb seeds 279 upon entry into trench 299 and change its orientation. To assist with holding seeds 279 in their orientation until trench 299 is closed, a foam can be deposited into trench 299. FIG. 15 illustrates nozzle 280 delivering foam 289 to trench 299. Nozzle 280 is supplied by conduit 281.

Foam 289 can be any foam that forms a structure for holding seeds 279 but dissipates over time. In one embodiment, foam 289 is biodegradable. Examples of materials for generating foam include, but are not limited to, surfactants. Foam delivery systems and foams that can be used are described in U.S. Patent Application Publication Nos. US20150093426A1, US20150366187A1, US20170181433A1, and US20180032776A1. Nozzle 280 can be nozzle 84 and conduit 281 can be sub-stream **22*a-d*** as described in US20150093426A1.

EXAMPLES

The following are nonlimiting examples.

Example 1—a method of depositing oriented seeds into a trench comprising: forming a trench; depositing a foam into the trench; and depositing seed from a seed orientation device into the foam in the trench.

Example 2—the method of Example 1 further comprising closing the trench.

Example 3—an agricultural row unit comprising: a frame; an opening unit connected to the frame for opening a trench as the row unit moves in a direction of travel; a foam delivery tube for delivering foam into the trench opened by the opening unit; and a seed orientation device disposed rearward from the foam delivery tube for delivering oriented seeds in the foam delivered by the foam delivery tube.

Example 4—the agricultural row unit of Example 3 further comprising a closing unit attached to the row frame for closing the trench.

The terminology used herein is for the purpose of describing particular embodiments only and is not intended to be limiting of the invention. As used herein, the term "and/or" includes any and all combinations of one or more of the associated listed items. As used herein, the singular forms "a,", "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence of addition of one or more other features, steps, operations, elements, components, and/or groups thereof. The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of depositing oriented seeds into a trench comprising:

forming a trench;

depositing a foam into the trench; and depositing at least one seed from a seed orientation device into the foam in the trench;

wherein the seed orientation device comprises a curved pathway comprising:

a seed riding surface configured to engage a face of the at least one seed; and a seed guide wall that adjoins to the seed riding surface and is configured to engage a side of the at least one seed when the at least one seed is traversing along the seed riding surface;

wherein the foam maintains orientation of the at least one seed in the trench.

2. The method of claim 1 further comprising closing the trench.

3. The method of claim 1, wherein the seed orientation device further comprises:

a seed transfer assembly configured to receive the at least one seed from an agricultural planting machine and provide a pathway for the at least one seed to a seed orientation coil assembly, the seed orientation coil assembly defining the curved pathway for the at least one seed from a seed entry aperture to a seed exit aperture within the ground.

4. The method of claim 3, wherein the seed transfer assembly comprises:

a seed transfer tube; and a seed collector having a seed receiving aperture, a seed exit aperture coupled to the seed transfer tube, and an air line connection configured to connect to a source of pressurized air and to inject the pressurized air into the seed collector between the seed receiving aperture and the seed exit aperture to aid movement of the at least one seed through the seed transfer tube to the seed orientation coil assembly.

5. The method of claim 4 further comprising:

a seed orientation support structure having a connection flange configured to connect to the agricultural planting machine; and support connections for the seed collector and the seed orientation coil assembly.

6. The method of claim 5, wherein the seed orientation support structure further comprises a mounting assembly for a furrow opener.

7. The method of claim 3, wherein the seed orientation coil assembly further comprises an incoming air feed configured to inject air into the seed orientation coil assembly from a source of pressurized air.

8. The method of claim 7, wherein the curved pathway of the seed orientation coil assembly has an outer coil, said outer coil including a central aperture in which an injector core is disposed.

9. The method of claim 8, wherein the incoming air feed is operably connected to a first end of the injector core and configured to feed pressurized air into an interior of the injector core, the injector core including an injector vent system disposed through an injector core outer wall that is configured to inject said pressurized air from said injector core interior to the outer coil.

10. The method of claim 8, wherein the outer coil includes an outer vent system disposed through an exterior wall of the outer coil that is configured to vent air from adjacent the curved pathway to an exterior of the outer coil.

11. The method of claim 1, wherein the seed riding surface is angled radially outward so as to direct the at least one seed to an intersection area where the seed guide wall adjoins to the seed riding surface.

12. The method of claim 1, wherein the seed orientation device comprises:

a seed orientation coil configured to receive seeds from a planter, the seed orientation coil including the curved seed path; and a pressurized air system configured to direct an air flow having at least a parallel component traveling adjacent to the curved seed path;

wherein the air flow is configured to direct the seed into a seed tip down orientation with the seed in contact with the curved seed path on a flat side of the seed and is configured to propel the seed down the curved seed path to a seed exit.

13. The method of claim 1, wherein the curved seed path comprises a helix.

14. The method of claim 12, wherein the pressurized air system includes a plurality of nozzles to direct the air flow over the curved seed path, and wherein the seed orientation coil assembly further comprises:

a vented outer coil;

an outer vent system disposed about an exterior wall of the vented outer coil that is configured to vent air from adjacent the curved seed path to an exterior of the vented outer coil; and an injector core disposed within the vented outer coil that is configured to inject the pressurized air from the injector core interior to the vented outer coil.

15. The method of claim 12 further comprising a sub-furrow opener adjacent to the seed exit and configured to create a furrow for the seed below a planter furrow formed by an agricultural planting machine.

16. An agricultural row unit comprising:

a frame;

an opening unit connected to the frame for opening a trench as the row unit moves in a direction of travel;

a foam delivery tube for delivering foam into the trench opened by the opening unit; and a seed meter configured to discharge at least one seed;

a seed orientation device disposed rearward from the foam delivery tube for delivering the at least one seed oriented in the foam delivered by the foam delivery tube;

wherein the seed orientation device comprises a curved pathway comprising:

a seed riding surface configured to engage a face of the at least one seed; and a seed guide wall that adjoins to the seed riding surface and is configured to engage a side of the at least one seed when the at least one seed is traversing along the seed riding surface;

wherein the foam maintains orientation of the at least one seed in the trench.

17. The agricultural row unit of claim 16 further comprising a closing unit attached to the row frame for closing the trench.

18. The agricultural row unit of claim 16, wherein the seed orientation devices further comprises:

a seed transfer assembly configured to receive the at least one seed from the seed meter and provide a pathway for the at least one seed to a seed orientation coil assembly, the seed orientation coil assembly defining the curved pathway for the at least one seed from a seed entry aperture to a seed exit aperture within the ground.

19. The agricultural row unit of claim 18, wherein the seed transfer assembly comprises:

a seed transfer tube; and a seed collector having a seed receiving aperture, a seed exit aperture coupled to the seed transfer tube, and an air line connection configured to connect to a source of pressurized air and to inject the pressurized air into the seed collector between the seed receiving aperture and the seed exit aperture to aid movement of the at least one seed through the seed transfer tube to the seed orientation coil assembly.

20. The agricultural row unit of claim 19 further comprising:

a seed orientation support structure having a connection flange configured to connect to the row unit; and support connections for the seed collector and the seed orientation coil assembly.

21. The agricultural row unit of claim 20, wherein the seed orientation support structure further comprises a mounting assembly for the opening assembly.

22. The agricultural row unit of claim 18, wherein the seed orientation coil assembly further comprises an incoming air feed configured to inject air into the seed orientation coil assembly from a source of pressurized air.

23. The agricultural row unit of claim 22, wherein the curved pathway of the seed orientation coil assembly has an outer coil, said outer coil including a central aperture in which an injector core is disposed.

24. The agricultural row unit of claim 23, wherein the incoming air feed is operably connected to a first end of the injector core and configured to feed pressurized air into an interior of the injector core, the injector core including an injector vent system disposed through an injector core outer wall that is configured to inject said pressurized air from said injector core interior to the outer coil.

25. The agricultural row unit of claim 23, wherein the outer coil includes an outer vent system disposed through an exterior wall of the outer coil that is configured to vent air from adjacent the curved pathway to an exterior of the outer coil.

26. The agricultural row unit of claim 16, wherein the seed riding surface is angled radially outward so as to direct the at least one seed to an intersection area where the seed guide wall adjoins to the seed riding surface.

27. The agricultural row unit of claim 16, wherein the seed orientation device further comprises:

a seed orientation coil configured to receive seeds from a planter, the seed orientation coil including a curved seed path; and a pressurized air system configured to direct an air flow having at least a parallel component traveling adjacent to the curved seed path;

wherein the air flow is configured to direct the seed into a seed tip down orientation with the seed in contact with the curved seed path on a flat side of the seed and is configured to propel the seed down the curved seed path to a seed exit.

28. The agricultural row unit of claim 16, wherein the curved seed path comprises a helix.

29. The agricultural row unit of claim 27, wherein the pressurized air system includes a plurality of nozzles to direct the air flow over the curved seed path, and wherein the seed orientation coil assembly further comprises:

a vented outer coil;

an outer vent system disposed about an exterior wall of the vented outer coil that is configured to vent air from adjacent the curved seed path to an exterior of the vented outer coil; and an injector core disposed within the vented outer coil that is configured to inject the pressurized air from the injector core interior to the vented outer coil.

30. The agricultural row unit of claim 27 further comprising a sub-furrow opener adjacent to the seed exit and configured to create a furrow for the seed below a planter furrow formed by an agricultural planting machine.

* * * * *